UNITED STATES PATENT OFFICE.

JAMES REGINALD KEMP, OF NEWBURY, ENGLAND.

ROTARY ENGINE ADAPTABLE AS MOTOR, PUMP, OR METER.

1,407,426. Specification of Letters Patent. Patented Feb. 21, 1922.

Application filed January 16, 1919. Serial No. 271,456.

*To all whom it may concern:*

Be it known that I, JAMES REGINALD KEMP, a subject of the King of Great Britain, and a resident of "Oakhurst," Woodhay, Newbury, Berkshire, England, have invented an Improved Rotary Engine Adaptable as Motor, Pump, or Meter, of which the following is a specification.

This invention relates to a novel construction and arrangement of rotary engine which is capable of being employed as a motor, a pump, a blower or a meter. The rotary engine constructed according to this invention has a novel method or principle of operation of the casing, the piston, and the shaft with relation to each other.

I provide a closed casing having two parallel flat interior walls the exterior of each of which is provided with a centrically arranged rim or flange preferably integrally formed with the casing upon which rim or flange are mounted the bearings of the casings which bearings may be of any suitable kind. The bearings are carried on standards secured to or integrally formed with the base plate.

Mounted in the same plates or standards are other bearings eccentrically arranged to the first mentioned bearings, and these bearings carry the shaft of the engine which extends through the said casing. Formed integrally with the said shaft are wing plates or blocks of the same or approximately the same thickness as the diameter of the shaft. The said wing plates are preferably rectangular in section and are of equal length.

The piston is adapted to slide upon the said wing plates or on guides secured thereto, the sliding or guide surface plates being provided on the interior of the piston for the purpose. Clearance spaces are provided at each end of the piston to permit the piston to reciprocate upon the shaft wing plates, these spaces being preferably rather greater than the distance between the centres of rotation of the shaft and the casing. The piston slides or reciprocates on the interior surface of the casing and is provided with packing means, the stroke of the piston within the casing is determined by the relative degree of eccentricity of the casing bearings to the shaft bearings.

The piston in plan section is semi-circular at the two ends, with two flat sides, corresponding with the walls of the casing.

In the preferred construction, the piston is conveniently formed in two parts bolted together after fitting the shaft and wing plates within same. The piston is provided for packing purpose with two L-section plates, one mounted on each side thereof preferably by means of a lip or flange fitting in a groove or recess formed in the sliding face of the piston to retain the plates in position. The plates are pressed by the operating liquid or fluid within the casing upon the flat inner walls of the casing to prevent leakage of fluid by the piston. Similar packing means are provided on the semi-circular ends of the piston.

The casing, the piston and drum, the shaft and wing plates all rotate together and at the same speed, the piston reciprocates within the casing and also reciprocates upon the shaft and its wing plates, the relative movements being determined as before stated, by the eccentricity of the casing relatively to the shaft, the diameter of the casing bearing rim or flange on its interior must be sufficient to permit of the eccentric movement of the casing relatively to the shaft.

In constructing the engine as a motor, for example, an internal combustion engine, the necessary ports and valves are provided on the casing.

Whether the engine be employed as a motor or as a pump, in order to provide against want of balance, two, three or more such casings and pistons may be fitted on one shaft, if two are fitted, the casings may be oppositely arranged or at 90 degrees apart. If three are fitted they will be arranged at 120 degrees, if four are fitted each casing will be 90 degrees from the next.

In order to illustrate the invention, one example of it is shown in the accompanying drawings, constructed as an internal combustion engine of the four stroke cycle. It will be understood that the drawings are diagrammatic.

Figure 1:
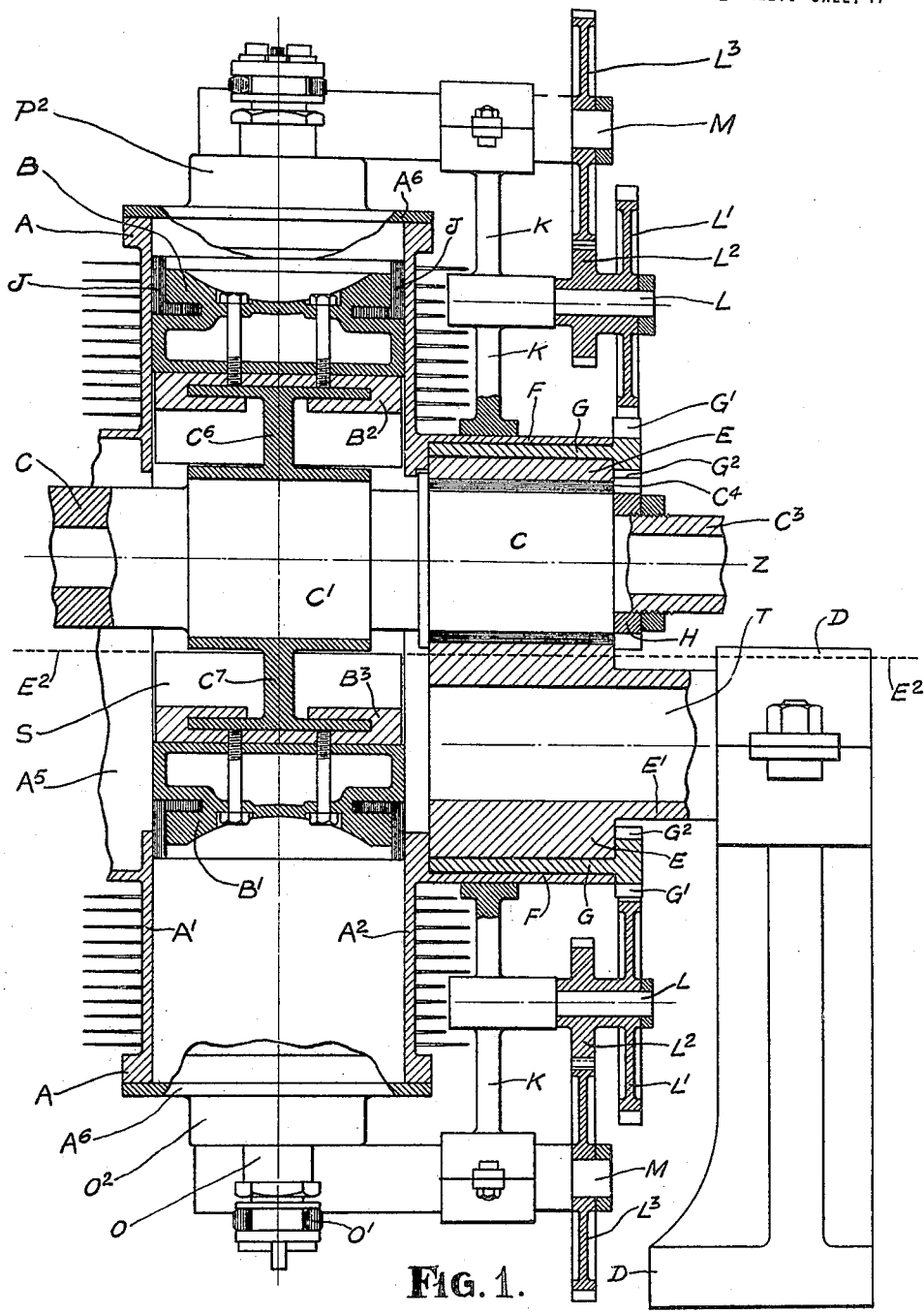
Fig. 1 is a sectional elevation, the section being in the plane of the shaft axis, and also of the casing axis.
Figure 2:
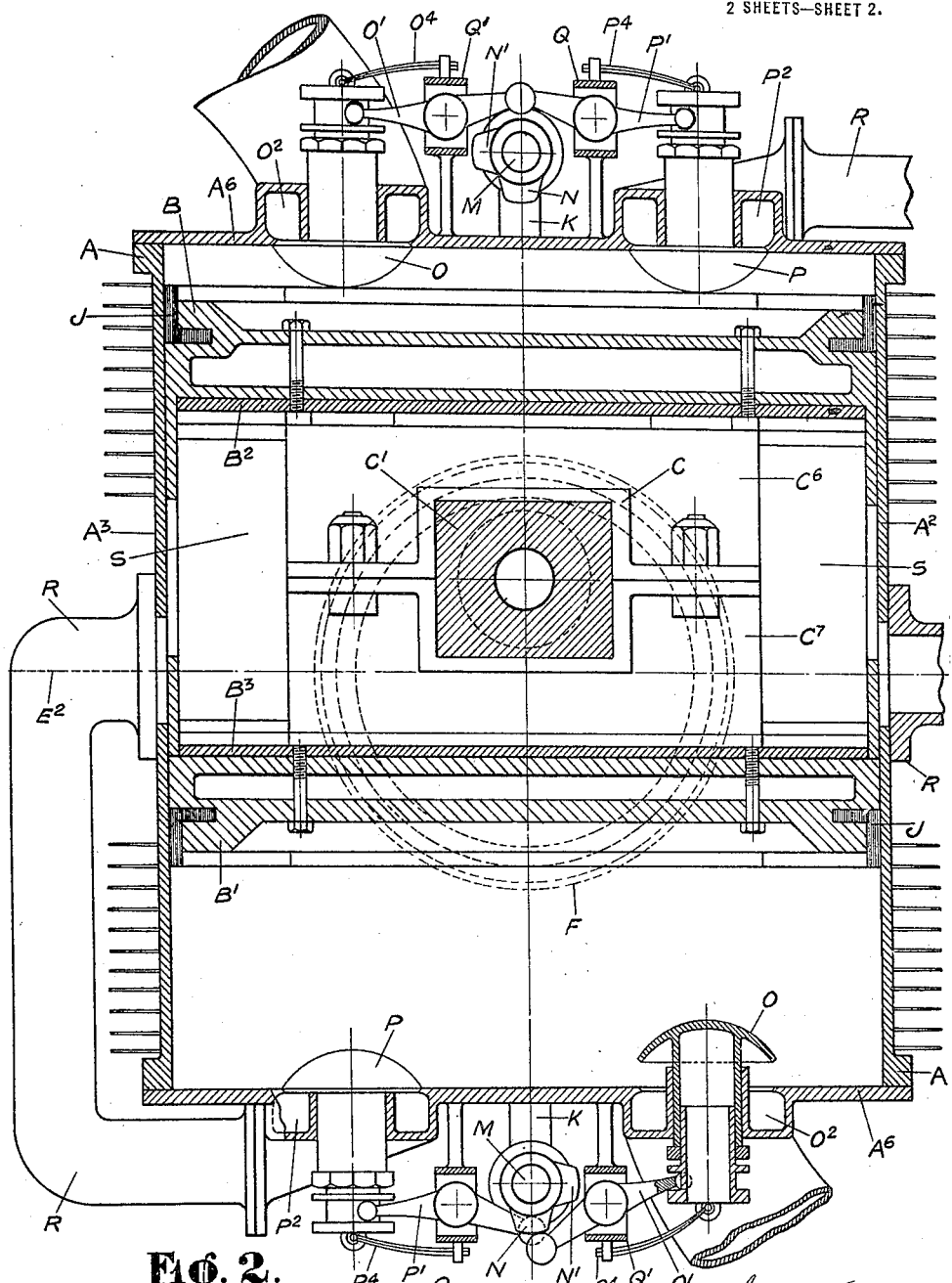
Fig. 2 is a section transversely to or at right angles with the section shown in Fig. 1.

A is the casing or casting provided with cooling webs or ribs on its exterior. The casing A has two flat sides $A^1$, $A^2$, Fig. 1, showing a section through the centre of the flat sides and having semi-circular ends $A^3$, A⁴, Fig. 2. In Fig. 2, the section is shown through the centre of the semi-circular ends. The casing A is one of a plurality of casings. There are preferably three such casings, (the others being arranged to the left hand of Fig. 1) bolted together by means of the lateral cylindrical extension A⁵ projecting from the flat side of the casing, the casing being arranged at 120 degrees to the next and mounted upon the same shaft C. Each casing A is provided with two pistons B, B¹, secured together as afterward described and adapted to fit within and to reciprocate within the casing. The shaft C which is preferably tubular and is shown broken off in Fig. 1, extends through the other two casings and is provided with blocks or wing-plates C¹ integrally formed therewith, one for each pair of pistons. The end C³ of the shaft may extend beyond the standard D in order to carry a pulley or the like. The standard or pedestal D is rigidly bolted or integrally formed with a bed or base plate of any suitable kind (not shown) a similar standard being provided at the other end of the engine. The standard D has rigidly mounted therein the eccentric E integrally formed with the short length of shaft E¹ which shaft is clamped in the standard D. The centre line E² of the fixed eccentric E is the axial line upon which the two casings rotate. The shaft C is mounted to rotate within the bearing C⁴ fitted within the stationary eccentric block E, the distance between the axial line of the shaft C and the centre E² of the fixed or stationary eccentric E provides the equivalent of the crank throw in an ordinary engine, and the stroke of the piston is therefore twice the distance of that shown between the two said axial centres. The casing A is provided with the centrically arranged rim or flange F which is preferably integrally formed with the casing. The said rim or flange F fits and is adapted to rotate upon the exterior of the fixed eccentric block or sheave E. There is fitted between the flange F which is integrally formed with the casing and the exterior of the fixed eccentric E, the annulus or ring of metal G which serves not only as a bearing between the said rim or flange F and the eccentric E, but the said ring has integrally formed therewith on its exterior the external teeth G¹ and on its interior the internal teeth G². The said internal teeth engage with the teeth upon the spur wheel H which is rigidly secured to the shaft C. The shaft therefore in rotating, rotates the ring with the internal and external teeth. The said exterior teeth operate the valves by means of the gear wheels meshing with them as afterward described.

Each of the pistons B, B¹, has bolted thereto on its inner surface a guide surface plate B², B³, shown in section in Fig. 1, which plates are adapted to receive the slides C⁶ C⁷ of T-section. The slides C⁶ C⁷ are formed separately as shown in Fig. 2, and are rigidly bolted over the wing block C¹ of the shaft C by means of recesses formed in said slides which therefore rotate therewith. The slides C⁶ C⁷ therefore slide laterally along the piston simultaneously with the reciprocation of the pistons in the casing, both movements being due to the eccentricity of the casing centre line or axis E² with relation to the centre shaft line or axis Z, indicated by dotted lines in Fig. 1.

Each piston is provided with metallic strips J of L-form in section, one arm of the L being fitted in a groove in the piston, the other arm of the L is adapted to slide upon the interior surface of the casing wall for packing purposes to prevent leakage of the working fluid or gases. For each piston therefore the L packing pieces are in four portions, two semi-circular portions one at each end and two straight portions adapted to correspond with the flat interior walls at the centre of each casing, and of each piston, the ends of each segment J of piston packing are adapted to overlap.

Mounted on the exterior of the rim or flange F and rigidly secured thereto are the valve gear brackets K adjacent each end of the casing, which brackets carry the stationary spindles L, L, upon each of which is mounted upon one sleeve a pair of spur gear wheels L¹, L², the larger of which L¹ meshes with the external teeth G¹ on the toothed ring G. The wheels L¹ mesh diametrally opposite each other with the teeth G¹ on the ring G. The pinions L² L² mesh with the spur wheels L³ L³ which are keyed to the shafts M M. Each shaft M is mounted in bearings at each end of the casing A carried partly by the said brackets K and partly by the cover or end plates A⁶, A⁶, of the casing A. The other end of each shaft M has keyed thereon two cams N, N¹, arranged at 90 degrees apart, the one to operate the inlet valve and the other the exhaust valve.

The construction and operation of the valves is similar at both ends of the engine casing. The exhaust valve O and the inlet valve P are formed hollow as shown in order to permit of air passing into the interior and cooling same during the rotation of the engine. The brackets Q, Q¹ carry the fulcrum pins of the tappet levers O¹ P¹ for operating the valves O and P respectively by means of the cams N N¹. The valve boxes O² P² are preferably cast integrally with the cover plates A⁶. The laminated springs O⁴ P⁴ close the valves after operation by the cams.

The charge is conveyed to the combustion chambers at the ends of the casing between the pistons and the cover plates by means of the transfer pipes R which connect the inlet valve boxes P² to the interior chamber S between the two pistons, which pipes are alike at each end of the casing, see Fig. 2, one of which pipes R, is shown broken off at the right hand of Fig. 2. The new charge or mixture is conveyed to the chamber S through the stationary hollow shaft T, the carburetter (not shown) being conveniently attached thereto on the outside of the standard D.

The casing A rotates upon the fixed eccentric sheave E and by means of the pistons and the slides fitted thereto, rotates the shaft C. The shaft C by means of the spur wheel H keyed thereto rotates the toothed ring G which rotates the valve shafts M by the intermediate gear wheels, and thereby operates the valve at each end of the casing at the required times.

What I do claim as my invention and desire to secure by Letters Patent is:—

1. In a rotary engine, the combination of a stationary drum provided with a longitudinally extending eccentrically arranged bearing therein, a casing having a centrally disposed annular bearing rotatably fitting upon the drum, a pair of reciprocating pistons within the casing, each of said pistons having a transverse guide channel at its inner end, a power shaft mounted in the eccentric bearing of the drum and having an angularly faced part thereon in fixed relation thereto, and a pair of plates detachably secured together about said angularly faced part and having slides engaging the respective guide channels of the pistons.

2. In a rotary engine, the combination of a stationary drum provided with a longitudinally extending eccentrically arranged bearing therein, a casing having a centrally disposed annular bearing rotatably fitting upon the drum, a reciprocating piston in the casing provided at its inner end with a guideway, a power shaft mounted in the eccentric bearing of the drum and having an angularly faced part thereon in fixed relation thereto, and a plate secured to the angularly faced part of the power shaft, said plate having an extension provided with a slide engaging the guideway on the inner end of the piston.

3. In a rotary engine, the combination of a stationary drum provided with a longitudinally extending eccentrically arranged bearing, a casing having oppositely disposed flat side walls and intermediate semi-circular side walls, a centrally disposed annular flange projecting from one of the flat side walls of the casing and rotatably fitting upon the drum, a reciprocating piston within the casing, and a power shaft mounted in the eccentric bearing in the drum and operatively connected with the piston.

4. In a rotary engine, the combination of a stationary drum having an eccentrically arranged bearing extending longitudinally thereof, a casing having a centrally disposed annular flange rotatably supported upon the outer face of the drum, a reciprocating piston within the casing, a power shaft rotatably supported in the bearing in the drum, and valve mechanism including an annular gear member rotatably fitting upon the outer face of said drum and having an internal gear and an external gear, a pinion on the power shaft meshing with the internal gear on the annular gear member, and gearing meshing with the external gear of the annular gear member.

5. In a rotary engine, the combination of a hollow shaft, a drum eccentrically arranged with relation to fixedly mounted upon said shaft, a casing centrically mounted to rotate upon the drum, a reciprocating piston within the casing, a mixture chamber within the casing, a power shaft eccentrically mounted with relation to the axis of the casing to rotate in bearings within the drum and operatively connected with the piston, said first mentioned hollow shaft constituting a mixture conduit leading to the mixture chamber within the casing, and transfer pipes leading from said mixture chamber to the inlet valves.

JAMES REGINALD KEMP.